(12) United States Patent
Greer et al.

(10) Patent No.: US 6,980,346 B1
(45) Date of Patent: Dec. 27, 2005

(54) DISPLAY DEVICE

(75) Inventors: Michael Greer, Corvallis, OR (US); Arthur R. Piehl, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/941,267

(22) Filed: Sep. 15, 2004

(51) Int. Cl.[7] .............................................. G02F 1/01
(52) U.S. Cl. ........................... 359/276; 345/87; 345/88
(58) Field of Search ................. 359/276, 260, 359/619, 620, 621, 622, 623; 345/55, 205, 345/98, 87, 88, 89, 90, 91, 92, 93, 94, 101, 345/102, 103, 589

(56) References Cited

U.S. PATENT DOCUMENTS

| | | | |
|---|---|---|---|
| 5,181,013 A | 1/1993 | Bagshaw et al. ............... 345/4 |
| 5,379,135 A * | 1/1995 | Nakagaki et al. ............... 349/9 |
| 5,771,321 A | 6/1998 | Stern ............................ 385/31 |
| 5,835,255 A | 11/1998 | Miles .......................... 359/291 |
| 5,986,796 A | 11/1999 | Miles .......................... 359/260 |
| 6,040,936 A | 3/2000 | Kim et al. .................... 359/245 |
| 6,040,937 A | 3/2000 | Miles .......................... 359/291 |
| 6,154,591 A | 11/2000 | Kershaw ....................... 385/39 |
| 6,373,632 B1 | 4/2002 | Flanders ...................... 359/578 |
| 6,392,341 B2 | 5/2002 | Jacobsen et al. ............ 313/506 |
| 6,574,043 B2 * | 6/2003 | Ramanujan .................. 359/464 |
| 6,850,352 B1 * | 2/2005 | Childers ...................... 359/237 |
| 2002/0015215 A1 | 2/2002 | Miles .......................... 359/290 |
| 2002/0024711 A1 | 2/2002 | Miles .......................... 359/247 |
| 2002/0036828 A1 | 3/2002 | Wong .......................... 359/585 |
| 2002/0054424 A1 | 5/2002 | Miles .......................... 359/291 |
| 2002/0126364 A1 | 9/2002 | Miles .......................... 359/247 |

OTHER PUBLICATIONS

Pentico, C, et al., "Ultra- High-Contrast Color-Management System for Projection Displays", *Society for Information Display International Symposium, Seminar, and Exhibition* (*SID 2003*), Baltimore, MD, (May 18-23, 2003), 1-4.

* cited by examiner

*Primary Examiner*—Hung Xuan Dang
*Assistant Examiner*—Tuyen Tra

(57) ABSTRACT

A method and apparatus includes receiving light at an intensity modulator. Subsequently, the light is received at an intensity-color modulator that includes at least one Fabry-Perot filter having a tunable optical property.

40 Claims, 6 Drawing Sheets

DISPLAY DEVICE

RELATED APPLICATIONS

This disclosure is related to pending U.S. patent application Ser. No. 10/428,261, titled "Optical Interference Pixel Display With Charge Control", filed on Apr. 30, 2003, assigned to the assignee of the embodiments disclosed herein, the Hewlett-Packard Development Company, and incorporated herein by reference in its entirety.

BACKGROUND INFORMATION

The usefulness of liquid crystal devices, including LCoS (liquid crystal on silicon) display devices, may arise from a combination of small pixel size and high aperture ratio. High resolution (e.g., 1920×1080 pixel) liquid crystal based microdisplays are widely available. However, various implementation limitations may exist, including the lack of direct color modulation capability, low contrast, the high cost of polarization management optics, and relatively low response speed.

DETAILED DESCRIPTION

Figure 1:
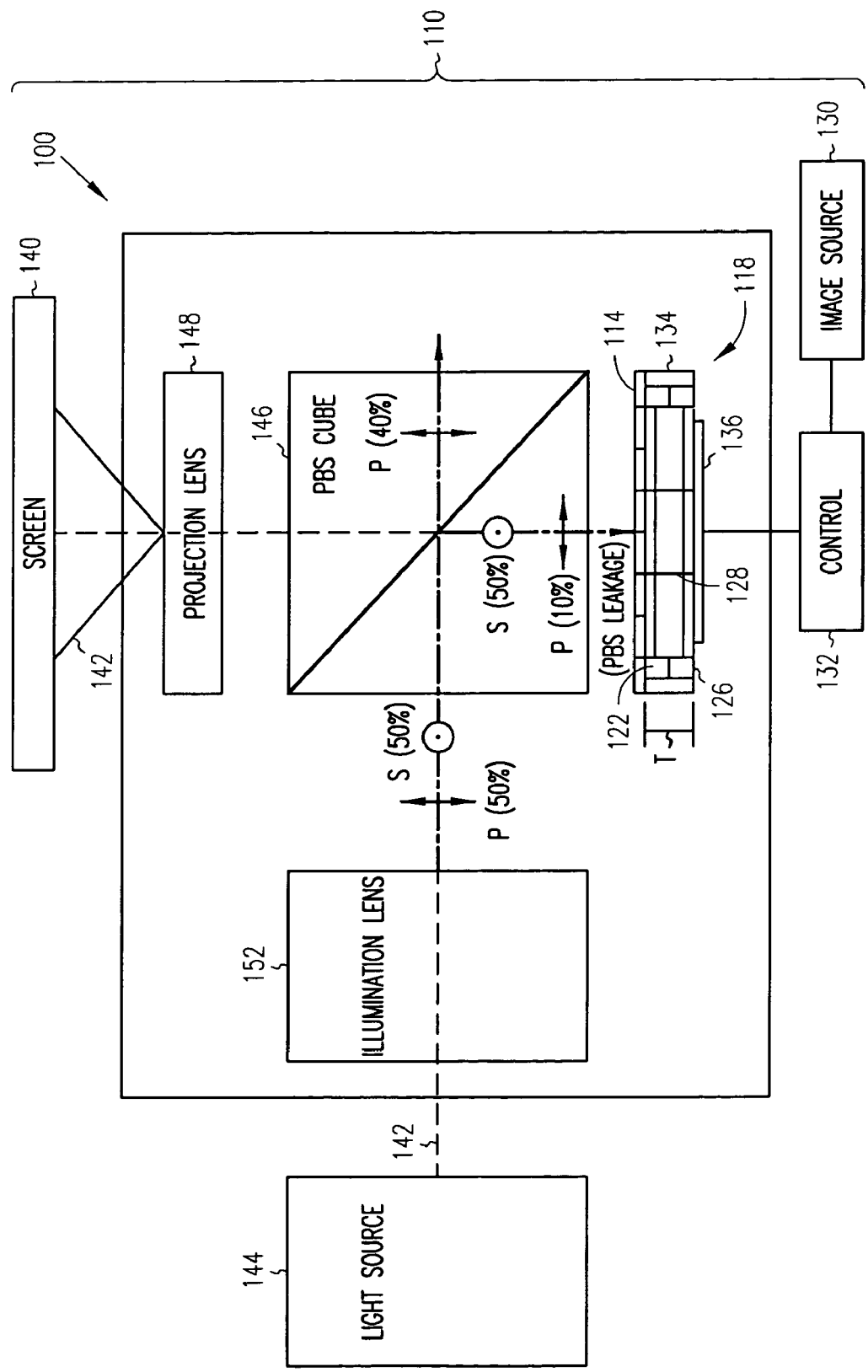
FIG. 1 is a block diagram of an apparatus and a system according to various example embodiments.

Liquid crystal microdisplays, including liquid crystal on silicon (LCoS) microdisplays used in polarization-based projector architectures, may provide a mediocre contrast ratio due to non-ideal polarization management and scattered or stray light in the projection engine. For example, non-ideal polarization management may be the result of stress birefringence in glass optics, skew ray angle depolarization in polarization beamsplitting (PBS) cubes, or low intrinsic contrast of the liquid crystal microdisplay itself. Such depolarizing effects may produce a black state that is too bright, thereby leading to poor contrast. Additionally, contemporary liquid crystal microdisplays lack the ability to modulate color directly.

In some embodiments, an intensity modulator (e.g., a liquid crystal layer) may be used in conjunction with an intensity-color modulator (e.g., a variable absorption backplane) to address the challenges posed by using conventional liquid crystal microdisplays. Thus, in terms of function, the intensity modulator and the intensity-color modulator can be thought of conceptually as an LCoS microdisplay wherein the fixed-reflectance backplane mirror is replaced with a mirror of variable absorptance/reflectance. In combination, the intensity modulator and the intensity-color modulator have the potential to render a greatly improved black state by reducing the contrast limiting effects associated with non-ideal polarization management, especially PBS cube performance, and by mitigating the effects of scattered light and stray light. Additionally, the intensity-color modulator has the ability to modulate color through interference effects.

For the purposes of this document, it should be understood that the term "intensity modulator" may include liquid crystal layers, such as LCoS (e.g., one or more pixelated liquid crystal layers), and other devices that operate to modulate light intensity, but not color. It should also be understood that the term "intensity-color modulator" may include one or more pixilated, variable absorption backplanes, and other devices that can operate to modulate both light intensity and color. The term "pixelated" used in conjunction with "intensity modulator" or "intensity-color modulator" refers to a spatial light modulator, such as an intensity modulator or intensity-color modulator that has independently-controlled pixels so as to be able to spatially modulate light intensity/color. Thus, an intensity modulator may comprise a pixelated intensity modulator, and an intensity-color modulator may comprise a pixelated intensity-color modulator.

The intensity-color modulator may be provided in a number of ways. For example, the variable absorption backplane may include an array of pixels where each pixel is composed of a top reflector and a bottom reflector separated by a distance T that define an optical cavity therebetween. The optical cavity may utilize optical interference to reflect a wavelength band of electromagnetic radiation, including visible light. The intensity of the reflected wavelength band (e.g. red light) may be controlled by rapidly modulating the optical cavity between substantial absorption and substantial reflection of the wavelength band. The wavelength band (e.g. red light) and/or the intensity may be selected in correspondence with one or more pixels of a displayable image, perhaps provided by an image signal source.

The optical cavity can be adjusted to reflect a wavelength band via optical interference. The wavelength band reflected by the optical cavity may depend on the optical path length of the cavity. Thus, the optical cavity may be tuned to reflect a desired wavelength band by, for example, controlling the physical thickness T of the cavity. The optical path length for each pixel in the intensity-color modulator can be individually controlled to reflect a specified wavelength band (e.g. red light) or be substantially absorptive across a large wavelength band, for example, absorptive across the entire visible band. That is, the optical cavity may be reflective or absorptive in nature depending on the electrical drive conditions. No light is generated directly by the optical cavity.

Because the intensity-color modulator possesses intrinsic color modulation functionality, there is flexibility in the way that color is managed in any given display system embodiment. As an example, in the case of a display system embodiment which utilizes a single variable absorption backplane, the variable absorption backplane may, (1) operate to produce a color field sequential mode (e.g. RGB subframes displayed sequentially) directly at the variable absorption backplane, without requiring an upstream color-wheel or color switching device, or (2) operate to produce a full-color mode directly at the variable absorption backplane by independently controlling the optical path length within each pixel. Other display system embodiments and color management modes are also possible.

FIG. 1 is a block diagram of an apparatus 100 and a system 110 according to various example embodiments, each of which may operate in the manner described. For example, an apparatus 100 may include one or more microdisplays comprising an intensity modulator 114 (e.g., a transmissive, pixelated, liquid crystal layer) and an intensity-color modulator 118 (e.g., a reflective, pixelated, variable absorption backplane) that is optically coupled to the intensity modulator 114.

Many variations of the fundamental combination may be realized. For example, some embodiments include an intensity modulator 114 aligned and optically bonded to an intensity-color modulator 118. One-to-one pixel mapping is not necessary; instead, for example, blocks of four liquid crystal pixels may be aligned to a single pixel in the intensity-color modulator, which may in turn be used to modulate color and intensity, if desired.

In some embodiments, the intensity-color modulator 118 may be coupled to a charge-controlling mechanism 132 to allow optical properties of the optical cavity 128 to be varied by controlling a predetermined amount of charge stored on the top and bottom reflectors 122, 126. In some embodiments, then, a charge-controlling mechanism 132, perhaps coupled to an image signal source 130, may be used to vary one or more optical properties of the optical cavity 128 defined by a pair of partially-reflecting surfaces (e.g., the reflectors 122, 126) and the distance T so as to reflect a desired wavelength band and intensity according to the image signal source information for each pixel.

Thus, each pixel in the intensity-color modulator 118 may include a top reflector 122 and a bottom reflector 126 to define a resonant optical cavity 128 having a controllable optical path length. The bottom reflector 126 may be highly reflective, including completely reflective. The top reflector 122 may be semi-transparent (i.e., semi-reflective). A spring mechanism 134 may be used to physically attach the top reflector 122 and the bottom reflector 126. The spring mechanism 134 may comprise a flexible material, such as a polymer, and may have linear or non-linear spring functionality.

The spring mechanism 134 may permit the thickness T of the cavity 128 to vary, by allowing one or both of the reflectors 122, 126 to move. More generally, the spring mechanism 134 may form part of a larger mechanism that allows variation of the optical properties of the optical cavity 128 so as to vary the band of reflected wavelengths and to vary the intensity of the reflected wavelength band.

A voltage applied between the reflectors 122, 126, or electrical charge stored on the reflectors 122, 126 may cause the thickness T of the cavity 128 to change, and the spring mechanism 134 may permit the reflectors 122, 126 to move. A flexure 136 may be attached to the spring mechanism 112 to make use of the spring restoring force, such that a voltage applied to the reflectors 122, 126 or the charge stored on the reflectors 122, 126 causes the flexure 136 and the spring mechanism 134 to yield and the reflectors 122, 126 to move, achieving the desired thickness T. A given thickness T may thereafter be maintained without the application of power.

In some embodiments, the bottom reflector 126 is maintained at a substantially fixed voltage, and the top reflector 122 is set to a voltage depending on the desired visible wavelength and the desired intensity, calibrated to the stiffness of the flexure 136. Furthermore, in some embodiments, there may be more than one optical cavity, such that the optical cavity 128 is inclusive of more than one such cavity.

In some embodiments, the bottom reflector 126 and the top reflector 122 can be considered to operate similarly to, or identically to the plates of a capacitor, where the optical cavity 128 represents the dielectric therebetween. A potential applied between the bottom reflector 126 and the top reflector 122 can move the bottom reflector 126, due to the operation of the flexure 110 and the spring mechanism 112; a charge may thus be stored in the capacitor formed by the reflectors 122, 126. The electrostatic charge may permit maintaining a given thickness T without further voltage application over the bottom reflector 126 and the top reflector 122. In some embodiments, then, the intensity-color modulator 118 may include a pair of partially-reflecting surfaces (e.g., the reflectors 122, 126) spaced apart by a distance T responsive to an amount of charge stored on the pair of partially-reflecting surfaces.

As noted previously, the optical cavity 128 of the intensity-color modulator 118 may utilize optical interference to reflect a desired wavelength band at a desired intensity. The optical cavity 128 may in some embodiments include a tunable metal-dielectric Fabry-Perot filter having an optical path length proportional to the distance T between the partially-reflecting surfaces. Light may be reflected from the reflectors 122 and 126 on either side of the cavity in such a way that they either constructively interfere, providing a high reflectance "on state", or destructively interfere, providing a low reflectance "off state". The phase difference between the beam that is reflected off of the partial reflector and the beam that is reflected off the bottom reflector is $\Delta\Phi = k*2d$ where d is the thickness T, and k is the wavenumber $2\pi/\lambda$. When $d=\lambda/2$, for example, the phase difference is $2\pi$ giving constructive intereference. When $d=\lambda/4$, the phase difference is $\pi$ giving destructive interference. Higher order modes of the cavity may also be used for example $d=m\lambda/4$ will give high reflectance when m is an even integer, and low reflectance when m is an odd integer. Although this simple model is useful for describing the primary mechanism of the device, more rigorous electromagnetic simulations may be useful to better describe the performance of a given device.

In some embodiments, the top reflector 122 includes a thin, partially transmitting metallic film. In this case, both absorption and intereference may operate to modulate the color and intensity of the reflected wavelength band. The optical cavity 128 may operate as an adjustable spacer, and the bottom reflector 126 may comprise a high-reflectance metallic substrate, including aluminum. It can be seen that in some embodiments, then, the intensity-color modulator 118 may include a Fabry-Perot filter having one or more tunable optical properties.

In some embodiments, the optical cavity 128 can achieve low reflection through absorption in the partially reflective layers and destructive interference by the optical cavity. In this state, the optical cavity 128 may operate as a so-called "dark mirror" that can be used to provide less than about five percent reflection. For example, in such an embodiment, the film stack sequence could be: 1000A Al reflector, 1000A air gap, 100A partial reflector with refractive index 2.5–2.5i, and an incident medium of 1.5 refractive index.

In some embodiments, an apparatus 100 may be constructed by aligning and optically bonding an off-the-shelf transmissive intensity modulator (e.g., liquid crystal display (LCD) microdisplay) 114 to an intensity-color modulator 118. High resolution (e.g., 1280×1224 pixel) LCD panels for digital projectors may be readily purchased at reasonable cost. The alignment between the intensity modulator 114 and the intensity-color modulator 118 does not need to be a one-to-one pixel mapping, as noted above. For example, blocks of four pixels on the intensity modulator 114 may be aligned to single pixels of the intensity-color modulator 118 (e.g., when an intensity-color modulator 118 is specified as having 960×540 resolution, and the intensity modulator 114 is specified as having full HDTV (1920×1080 pixel) resolution). Chromatic resolution may be increased by using sequential color over the four intensity modulator pixels.

For the apparatus 100 to produce an "on state" (e.g., where light is permitted to reach a projection lens), the intensity modulator may operate to rotate linearly polarized S input light by 90° in double pass and the pixelated, variable absorbtion backplane may operate in a substantially reflective mode. LCD microdisplays, similar to or identical to the Epson L3D13U Series, are commercially available from many manufacturers, including Seiko Epson Corporation, in Nagano, Japan. Such LCD panels are usually designed to rotate a linear input polarization by a full 90° in single pass, not double pass. However, a 90° rotation in double pass can be achieved with a commercially available LCD 114 by altering the drive voltage to the liquid crystal, and thus, the double pass birefringence.

For the apparatus 100 to produce an "off state" or black state, the intensity modulator 114 may operate to not rotate linearly polarized S input light in double pass, and the intensity-color modulator 118 may operate in a substantially absorptive mode. Here the intensity-color modulator 118 may operate to absorb most of the light 142 of each polarization (e.g., S and P). Any small amount of residual S light not absorbed by the intensity-color modulator 118 in the dark state should be reflected back to the illumination lens 152. Any amount of P light leaked by the PBS may be reduced to virtually nil after absorption by the intensity-color modulator 118. Thus, various embodiments may be distinguished from other reflective microdisplays (including DLP and LCoS), which are reflective in the black state and can allow some light (e.g. light leaked by a PBS or scattered light) to travel out to the projection lens, providing a bright black state and limited contrast.

In some embodiments, the apparatus 100 may include means 146 to polarize the light 142 (e.g., a polarizing beamsplitter cube, wire grid polarizer, or polymer polarizer) at one or more locations within the apparatus 100, for example, prior to the intensity modulator 114 and/or prior to a means 148 to project light. Thus, the system 110 may also include means (e.g., one or more projection lenses) 148 to project the light 142 to the screen 140. The means 148 may comprise any number of separate lens elements or groups, such as a group of lenses derived from a Cooke triplet, and/or a focusing lens. The means 148 may also comprise alternating positive and negative lenses, providing several degrees of freedom for variable focus adjustment. Although the paths followed by the light 142 are shown in FIG. 1 as being substantially perpendicular, other arrangements are possible, and the embodiments disclosed are not to be so limited.

A system 110 may include one or more apparatus, similar to or identical to the apparatus 100 described previously. The system 110 may also include one or more screens 140 to receive light 142 provided by a source 144, the light being reflected from the intensity-color modulator 118. The source 144 may comprise any number of illumination elements, including an arc lamp, such as a mercury arc lamp, and/or one or more light emitting diodes (LEDs), among others. In some cases, the source 144 may provide polarized light.

In some embodiments, the system 110 may include one or more image signal sources 130 to couple to the intensity-color modulator 118. The image signal source 130 may comprise any electronic signal source capable of transmitting information associated with an image so as to influence the optical properties of the intensity modulator 114 and/or the intensity-color modulator 118. Thus, the image signal source 130 may comprise one or more of a digital video disk (DVD) player, a wireless television tuner (e.g., receiving local or satellite signals), a cable television tuner (e.g., making use of electrical or optical signal reception), and a wireless computing device (e.g., a laptop computer, a personal digital assistant (PDA), and a tablet computer), among others. The image signal source 130 may include circuitry to convert image data or signals into electrical signals capable of changing the light transmission state of the intensity modulator 114 and/or the intensity-color modulator 118.

Some embodiments (e.g., a projector implementation) of the system 110 may include one or more polarizers to receive light prior to reception by the intensity modulator 114 and intensity-color modulator 118. The system 110 may also include an illumination lens 152 to relay light from the light source to the intensity modulator 114 and the intensity-color modulator 118. Yet other combinations of the intensity modulator 114 and an intensity-color modulator 118 are possible.

For example, a projection lens 148 may be used to project an image provided by an image signal source 130 coupled to the intensity modulator 114 and/or the intensity-color modulator 118 onto a screen 140, such as a movie screen placed on a wall, or a screen forming a portion of a rear-projection television set. In some embodiments, light 142 may be received at a polarizing element 146 and transmitted to one or more intensity-color modulators 118 along a non-linear path.

Figure 2:
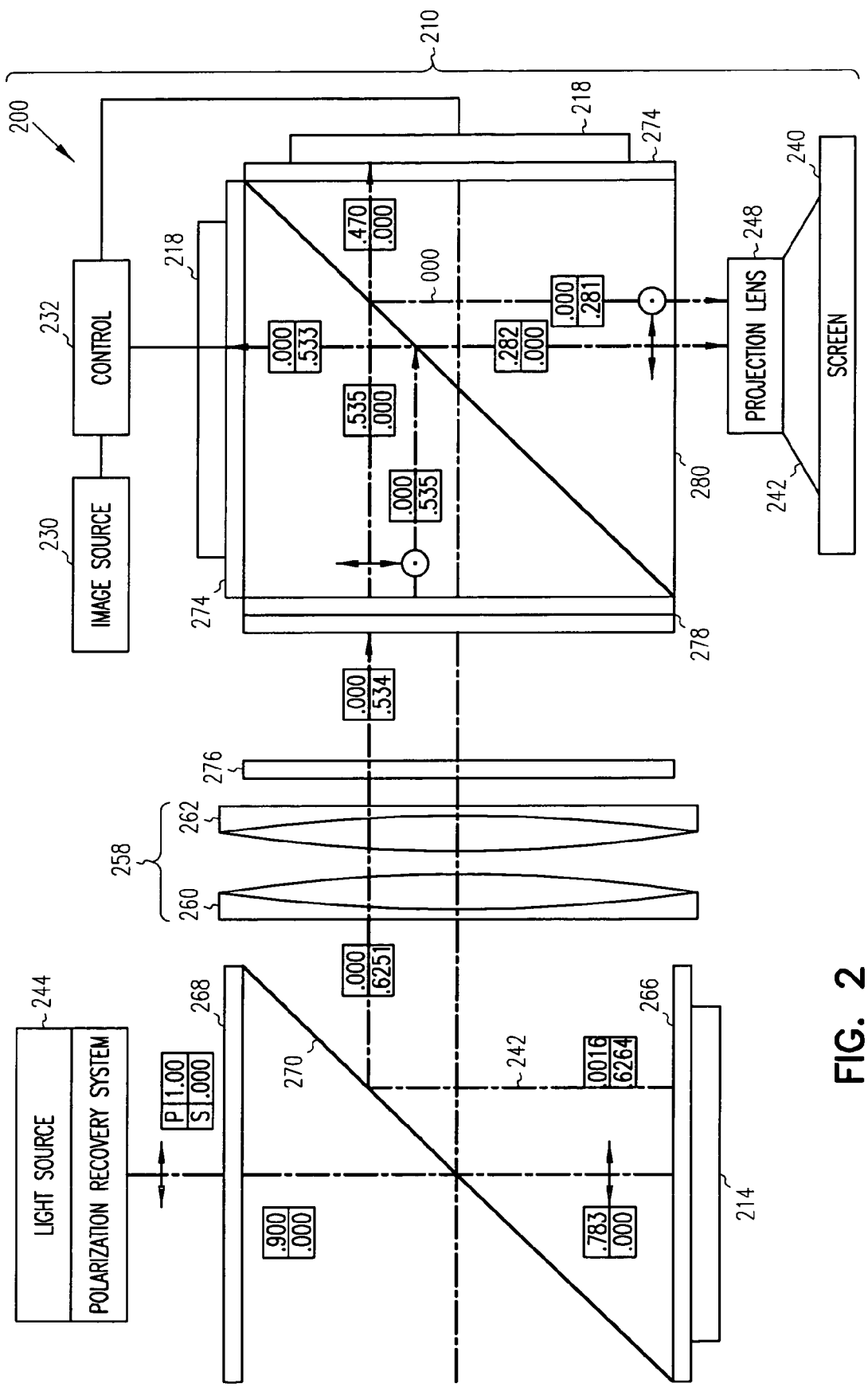
FIG. 2 is a block diagram of an apparatus and a system according to various example embodiments.

FIG. 2 is a block diagram of an apparatus 200 and a system 210 according to various example embodiments. In this case the apparatus 200 may include one or more LCoS microdisplays 214, one or more intensity-color modulators 218, and a relay lens 258 to couple light 242 from the reflective liquid crystal microdisplay 214 to the intensity-color modulators 218. The relay lens 258 may comprise any number of lens elements which image the LCoS microdisplay plane to the pixelated, variable absorption backplanes. The apparatus 200 in this case may be used in a system 210, such as a projector, that makes use of a LCoS microdisplay 214 for intensity modulation, and one or more intensity-color modulators 218 for color modulation and additional intensity modulation.

As shown in the apparatus 200, placing the intensity modulator 214 and intensity-color modulators 218 in series, permits the total available contrast to become approximately the product of the individual contrasts (noting that projector optics may limit the total contrast achieved). Because the potential available contrast is so high, tolerances required for optics that manage polarization in the system may be significantly relaxed compared to the tolerances required in LCoS-only designs.

In some embodiments, the apparatus 200 may include an intensity modulator 214, such as a high-definition television (HDTV) LCoS panel, optically coupled to a retarder 266, such as a quarter-wave plate. A first polarizer 268 may be disposed between a first polarizing beam splitter 270, such as a wire grid polarizer or PBS cube, and a source of illumination 244, which may directly provide polarized illumination. Alternatively, the source of illumination 244 may be unpolarized and be followed by a polarization recovery system well-known to those of skill in the art. Light shield(s) may be applied to the integrator plates to block unused light, if desired.

The apparatus 200 may also include multiple intensity-color modulators 218 coupled to quarter-wave plates 274. A second polarizer 276, perhaps operating as a cleanup polarizer, may be disposed between the relay lens 258 and a retarder 278, such as a red/cyan selective retarder (e.g., a ColorSelect filter available from Colorlink, Inc. of Boulder, Colo.) coupled to a polarizing beamsplitter 280, such as a PBS cube. The intensity-color modulators 218 may be functionally divided in several ways, such as between one pixelated, variable absorption backplane 218 for modulating blue/green light, and one pixelated, variable absorption backplane 218 for modulating red light. In FIG. 2, the optical layout shown indicates intensity values for P (upper box) and S (lower box) polarized light with respect to ON states.

In addition, using an intensity modulator 214 in series with one or more intensity-color modulators 218 may permit increasing the number of gray levels. With two modulators in series that can each modulate intensity, the number of possible intensity levels for white and each hue can be greatly increased so that many thousands of gray levels are possible.

In some embodiments, the intensity modulator 214 of the apparatus 200 may comprise an LCoS panel. A polarization beam splitter 270 (e.g. wire grid polarizer, PBS cube, etc) may be used to couple the light 242 to the intensity modulator 214 and the relay lens 258. In some embodiments, the apparatus 200 may include a first polarizer 268 disposed between the illumination source 244 and the intensity modulator 214, and a second polarizer 276 disposed between the relay lens 258 and the intensity-color modulators 218. In some embodiments, the apparatus 200 may include a PBS 280 disposed between the relay lens 258 and the intensity-color modulators 218. A red/cyan selective retarder (e.g., a ColorSelect filter from Colorlink, Inc.) can be placed at the input of the PBS 280 to further tailor spectral bands. Still further embodiments may be realized.

For example, a system 210 may include one or more apparatus, similar to or identical to the apparatus 200 previously described. In addition, the system 210 may include one or more screens 240 to receive light 242 provided by a source 244 and reflected from the intensity-color modulators 218. The screen 240 may comprise a rear projection television screen.

In some embodiments, the system 210 may include a PBS 280 to direct the light 242 to the intensity-color modulators 218. A projection lens 248 may be included in the system 210 and used to receive the light from the PBS 280. In some embodiments, the system 210 may include an image signal source 230 and control electronics 232, described above, to provide an electrical drive for the intensity-color modulator 218. Still further embodiments of the combination of a single intensity modulator 214 and multiple intensity-color modulators 218 may be realized.

Figure 3:
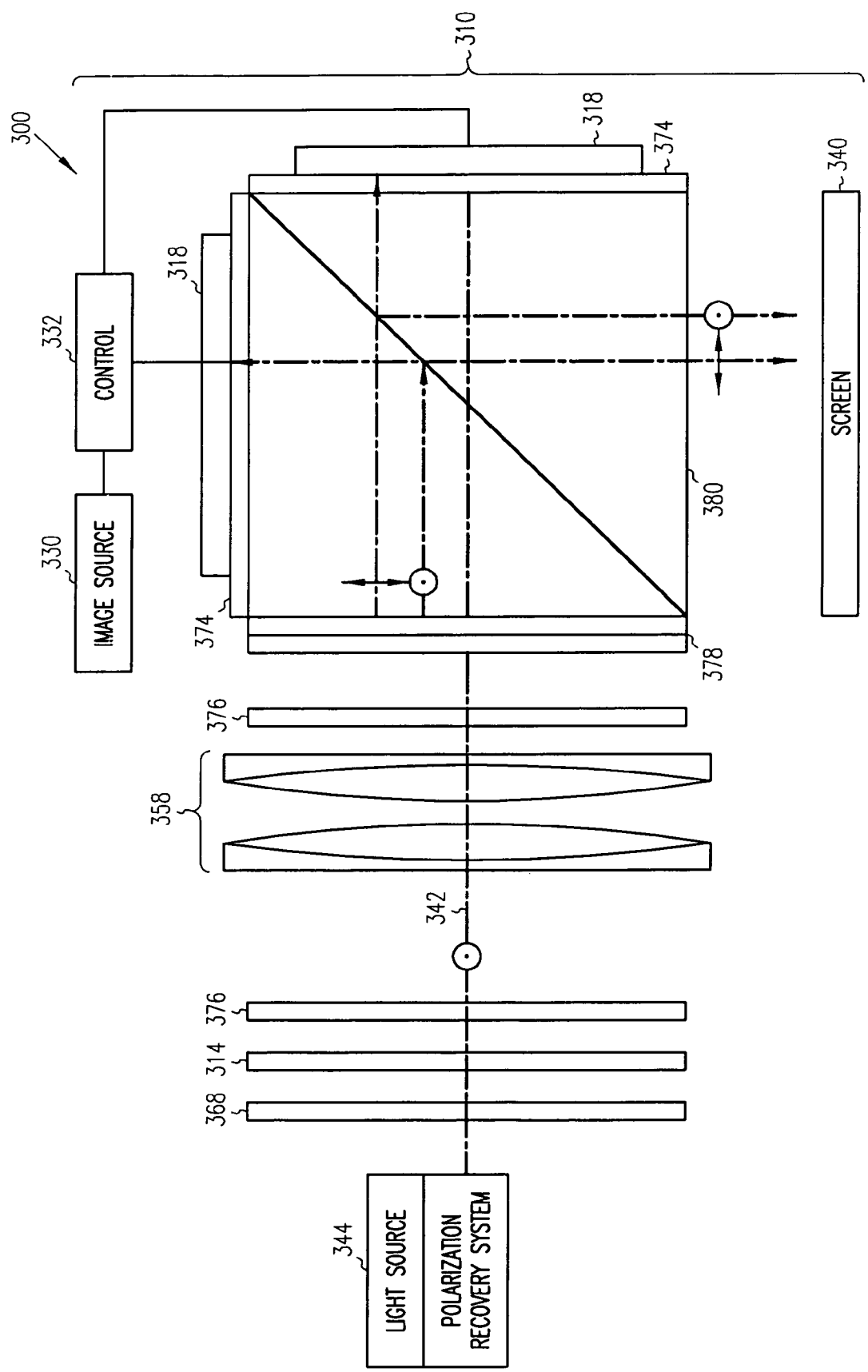
FIG. 3 is a block diagram of alternative apparatus and system example embodiments.

For example, FIG. 3 is a block diagram of alternative apparatus 300 and system 310 example embodiments. In this case, the apparatus 300 may include an intensity modulator 314 that may comprise a transmissive liquid crystal panel, perhaps providing a lower cost alternative to LCoS panel use.

Thus, an apparatus 300 may include an intensity modulator 314, one or more intensity-color modulators 318, and a relay lens 358 to couple light 342 from the intensity modulator 314 to the intensity-color modulators 318.

In some embodiments, a first polarizer 368 may be disposed between the intensity modulator 314 and a source of illumination 344, which may provide polarized illumination. As noted previously, the source of illumination 344 may be coupled to a polarization recovery system.

The apparatus 300 may also include multiple intensity-color modulators 318 coupled to quarter-wave plates 374. A second polarizer 376 may be disposed between the relay lens 358 and a retarder 378, such as a red/cyan selective retarder (e.g., ColorSelect filter from Colorlink, Inc.) coupled to a PBS 380, such as a PBS cube. The intensity-color modulators 318 may again be functionally divided in several ways, such as between one pixelated, variable absorption backplane 318 for modulating blue/green light, and one pixelated, variable absorption backplane 318 for modulating red light. Other embodiments may be realized.

For example, a system 310 may include one or more apparatus, similar to or identical to the apparatus 300 previously described. In addition, the system 310 may include one or more screens 340 to receive light 342 provided by a source 344 and reflected from the intensity-color modulators 318. In some embodiments, the system 310 may also include an image signal source 330 and control electronics 332, described above, to couple to the intensity-color modulators 318.

The apparatus 100, 200, 300; systems 110, 210, 310; intensity modulators 114, 214, 314; intensity-color modulators 118, 218, 318; top reflector 122; bottom reflector 126; optical cavity 128; image signal sources 130, 230, 330; charge-controlling mechanism 132, 232, 332; spring mechanism 134; flexure 136; means 146, 148; screens 140, 240, 340; light sources 144, 244, 344; illumination lens 152; relay lens 258, 358; magnifying lenses 260; collimating lenses 262; compensator 266; polarizers 268, 276, 368, 376; PBS 270; quarter-wave plates 274, 374; retarders 278, 378; PBSs 280, 380; and controllable thickness T may all be characterized as "modules" herein. Such modules may include optics, hardware circuitry, and/or one or more processors and/or memory circuits, software program modules, including objects and collections of objects, and/or firmware, and combinations thereof, as desired by the architect of the apparatus 100, 200, 300 and the systems 110, 210, 310 and as appropriate for particular implementations of various embodiments. The illumination lens 152, relay lenses 258, 358, and projection lenses 148, 248 may comprise reflective optical elements (e.g. mirrors) or refractive optical elements (e.g. glass or plastic lenses). Further, the illumination lens 152, relay lenses 258, 358, and projection lenses 148, 248 may comprise a single lens, a plurality of lenses coupled together into a unitary lens, or several physically-separate lenses.

It should also be understood that the apparatus and systems of various embodiments can be used in applications other than rear-projection televisions and video projectors, and thus, the various embodiments described herein are not to be so limited. The illustrations of an apparatus 100, 200, 300 and systems 110, 210, 310 are intended to provide a general understanding of the structure of various embodiments, and they are not intended to serve as a complete description of all the elements and features of apparatus and systems that might make use of the structures described herein. Thus, the apparatus 100, 200, 300 and systems 110, 210, 310 of various embodiments may further be included as sub-components within a variety of products, such as televisions, cellular telephones, personal computers, PDAs, workstations, radios, video players, automobiles, airplanes, personal video projection systems, among others.

Figure 4A:
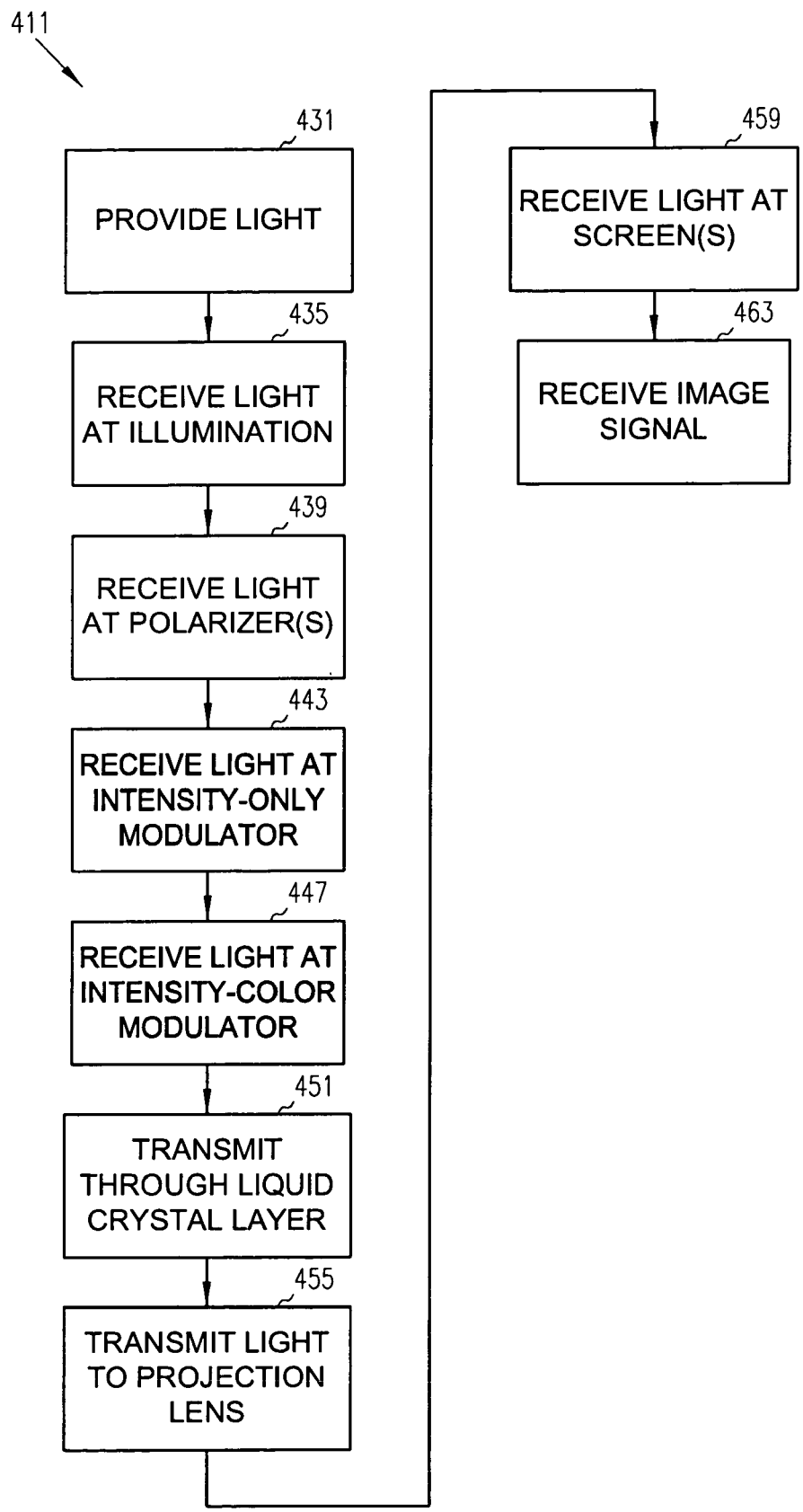
FIGS. 4A and 4B include flow diagrams illustrating several methods according to various example embodiments.
Figure 4B:
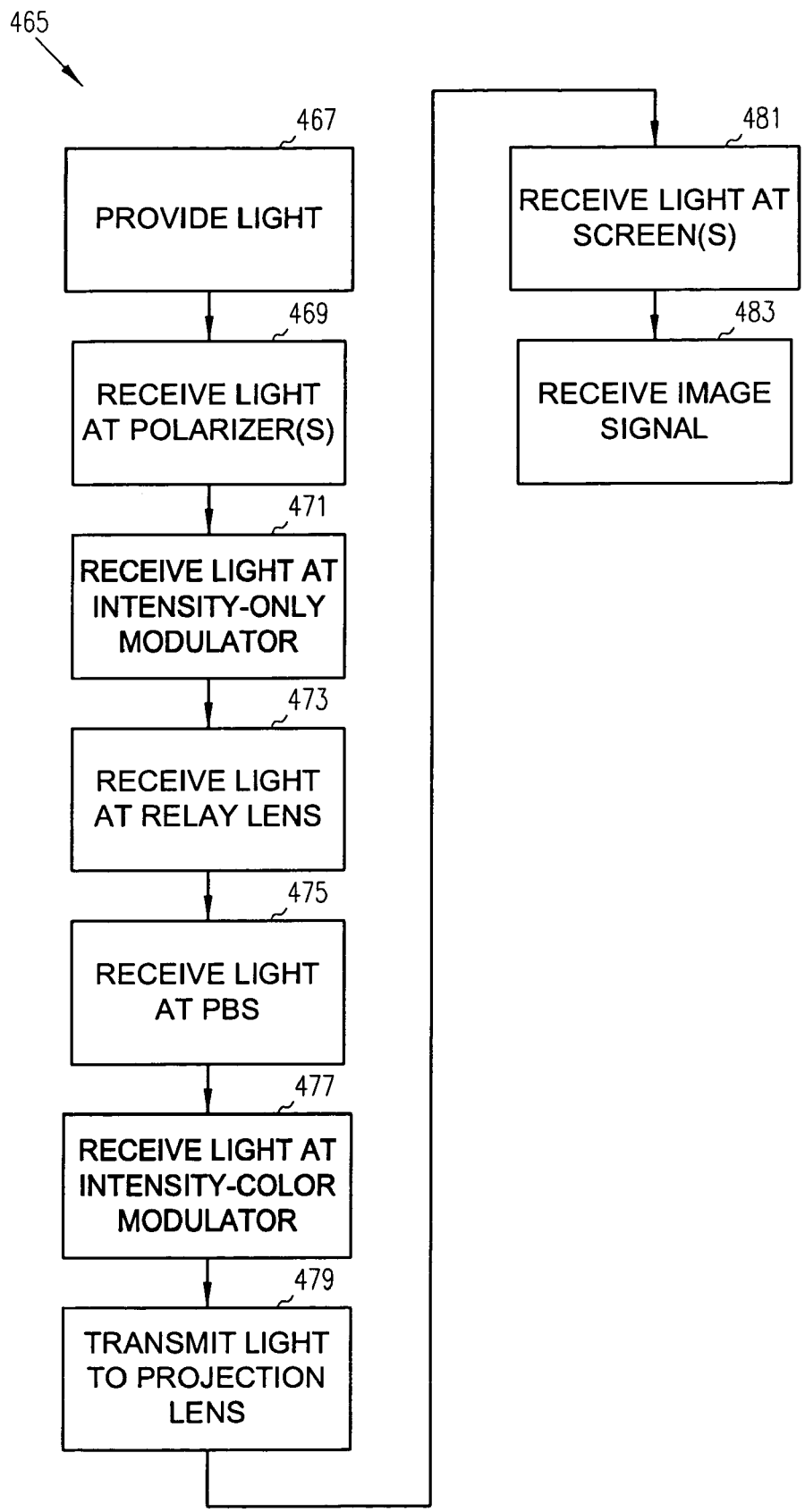

FIGS. 4A and 4B include flow diagrams illustrating several methods according to various example embodiments. Turning now to FIG. 4A, it can be seen that in some embodiments, a method 411 may (optionally) begin with providing a source of light, including polarized light, at block 431. The method 411 may continue with receiving the light from the source at an illumination lens at block 435, and then transmitting the light from the illumination lens to an intensity modulator, such as a liquid crystal layer, at block 443.

In some embodiments, the method 411 may include receiving the light at one or more polarizers (e.g., first and second polarizers, PBS, wire grid polarizer, etc.) subsequent to receiving the light from the illumination lens at block 435. Thus, the method 411 may include receiving the light at the intensity modulator, such as a liquid crystal layer, through at least one polarizer.

The method 411 may include receiving the light at an intensity modulator, such as a liquid crystal layer, at block 443 and subsequently receiving the light at an intensity-color modulator, such as a pixelated, variable absorption backplane, at block 447. In some embodiments, the method 411 may include reflecting the light from the intensity-color modulator (e.g., pixelated, variable absorption backplane) to the intensity modulator (e.g., liquid crystal layer) at block 451, as well as transmitting the light through the intensity modulator to a projection lens at block 455. The method 411 may (optionally) conclude with receiving the light from the projection lens at one or more screens at block 459, and receiving an image signal from an image signal source at the intensity-color modulator at block 463. Other embodiments may be realized.

For example, turning now to FIG. 4B, it can be seen that in some embodiments, a method 465 may (optionally) begin with providing a source of light, including polarized light, at block 467, as well as receiving light at one or more polarizers prior to receiving the light at an intensity modulator (e.g., a liquid crystal layer) at block 469. Thus, the method 465 may include receiving the light at a wire grid polarizer prior to receiving the light at the intensity modulator. As noted previously, the method 465 may therefore include receiving the light at the intensity modulator through at least one polarizer.

In some embodiments, the method 465 may include receiving light at the intensity modulator at block 471 and subsequently receiving the light at a relay lens at block 473. The method 465 may continue with receiving the light at a PBS subsequent to receiving the light at the relay lens at block 475.

The method 465 may continue with receiving the light from the PBS at one or more intensity-color modulators (e.g., pixelated, variable absorption backplanes, such as by transmitting the light from the relay lens to the pixelated, variable absorption backplane) at block 477, as well as transmitting the light from the intensity-color modulator(s) to a projection lens at block 479.

In some embodiments, as noted previously, one or more of the intensity-color modulators may comprise at least one Fabry-Perot filter having a tunable optical property. The method 465 may further include receiving the light from the intensity modulator at one or more screens via a projection lens at block 481, as well as receiving an image signal from an image signal source at the intensity-color modulator at block 483. In some embodiments, one or more of the screens may comprise a rear projection television screen, and the image signal source may comprise one or more of a digital video disk player, a wireless television tuner, a cable television tuner, and a wireless computing device.

As noted above, the light path may be folded in a number of ways, including, for example, such that a first light path taken by the light to the intensity modulator (e.g., liquid crystal layer) is substantially perpendicular to a second light path taken by the light to one or more of the intensity-color modulators (e.g., pixelated, variable absorption backplanes) (see FIG. 2). In addition, the light path may be folded such that a first light path taken by the light to the intensity modulator is substantially parallel to a second light path taken by the light to/from at least one of the intensity-color modulator(s) (see FIGS. 1 and 3).

It should be noted that the methods described herein do not have to be executed in the order described, or in any particular order. The words "subsequent," "prior," and similar terms are used to make it clear that a particular activity may come after, or precede, another, respectively. Moreover, various activities described with respect to the methods identified herein can be executed in simultaneous, serial, or parallel fashion. For the purposes of this document, the terms "information" and "data" may be used interchangeably. Information, including parameters, commands, operands, instructions, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or inter-process communication techniques, including semaphores and remote procedure calls. The teachings of various embodiments are not limited to any particular programming language or environment. Thus, other embodiments may be realized, as shown in FIG. 5.

Figure 5:
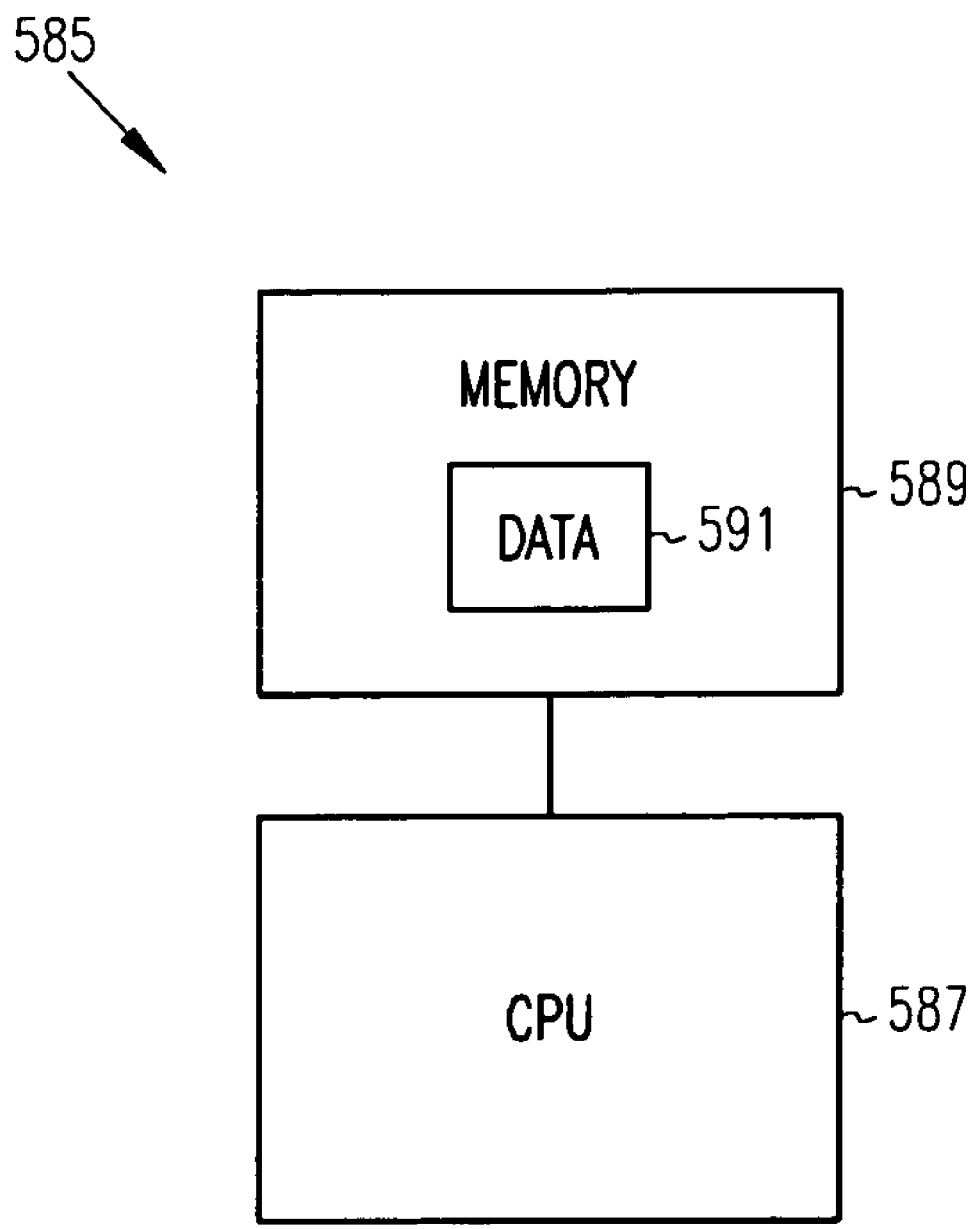
FIG. 5 is a block diagram of an article according to various example embodiments.

FIG. 5 is a block diagram of an article 585 according to various example embodiments, such as a computer, a memory system, a magnetic or optical disk, some other storage device, and/or any type of electronic device or system. The article 585 may comprise a processor 587 coupled to a machine-accessible medium such as a memory 589 (e.g., a memory including an electrical, optical, or electromagnetic conductor) having associated information 591 (e.g., computer program instructions, and/or other data), which when accessed, results in a machine (e.g., the processor 587) performing such actions as receiving light at an intensity modulator (e.g., a liquid crystal layer) and subsequently receiving the light at an intensity-color modulator (e.g., a pixelated, variable absorption backplane). Other actions may include receiving the light from the intensity modulator at a screen via a projection lens, wherein the screen comprises a rear projection television screen. Further actions may include receiving an image signal from an image signal source at the intensity-color modulator, wherein the image signal source comprises at least one of a digital video disk player, a wireless television tuner, a cable television tuner, and a wireless computing device. Additional activities, among others, may include receiving the light at the intensity modulator through at least one polarizer.

Implementing the apparatus, systems, and methods described herein may improve the contrast ratio that can be achieved with liquid crystal-based displays and projectors. Such implementations may also enable the manufacture of various consumer goods, such as televisions and projectors having improved performance.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments of the invention have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method, including:
receiving light at an intensity modulator; and
subsequently receiving the light at an intensity-color modulator that includes at least one Fabry-Perot filter having a tunable optical property.

2. The method of claim 1, including:
receiving light at a pixelated liquid crystal layer; and
subsequently receiving the light at a pixelated, variable absorption backplane.

3. The method of claim 2, further including:
transmitting the light from the intensity modulator to a projection lens.

4. The method of claim 3, further including:
receiving the light from the projection lens at a screen.

5. The method of claim 1, further including:
transmitting the light from the illumination lens to the intensity modulator.

6. The method of claim 5, further including:
receiving the light at a polarizing beamsplitter subsequent to receiving the light from the illumination lens.

7. The method of claim 1, further including:
transmitting the light from the intensity-color modulator through the intensity modulator.

8. A method, including:
receiving light at an intensity modulator;
subsequently receiving the light at a relay lens; and
transmitting the light from the relay lens to an intensity-color modulator that includes at least one Fabry-Perot filter having a tunable optical property.

9. The method of claim 8, further including:
transmitting the light from the relay lens to the intensity-color modulator comprising a pixelated, variable absorption backplane.

10. The method of claim 8, further including:
receiving the light at a first polarizer prior to receiving the light at the intensity modulator.

11. The method of claim 10, further including:
receiving the light at a polarizing beamsplitter prior to receiving the light at the intensity modulator.

12. The method of claim 8, further including:
receiving the light at a polarizing beamsplitter subsequent to receiving the light at the relay lens.

13. The method of claim 8, further including:
receiving the light from a polarizing beamsplitter at the intensity-color modulator.

14. An article including a machine-accessible medium having associated information, wherein the information, when accessed, results in a machine performing:
receiving light at an intensity modulator; and
subsequently receiving the light at an intensity-color modulator that includes at least one Fabry-Perot filter having a tunable optical property.

15. The article of claim 14, wherein the information, when accessed, results in the machine performing:
receiving the light from the intensity modulator at a screen via a projection lens.

16. The article of claim 15, wherein the screen comprises a rear projection television screen.

17. The article of claim 15, wherein the information, when accessed, results in the machine performing:
receiving an image signal from an image signal source at the intensity-color modulator.

18. The article of claim 17, wherein the image signal source comprises one of a digital video disk player, a wireless television tuner, a cable television tuner, and a wireless computing device.

19. The article of claim 14, wherein the information, when accessed, results in the machine performing:
receiving the light at the intensity modulator through at least one polarizer.

20. An apparatus, including:
a intensity modulator; and
an intensity-color modulator that includes at least one Fabry-Perot filter having a tunable optical property optically coupled to the intensity modulator.

21. The apparatus of claim 20, wherein the intensity modulator comprises a pixelated liquid crystal layer; and wherein the intensity-color modulator includes a pixelated, variable absorption backplane optically coupled to the pixilated liquid crystal layer.

22. The apparatus of claim 20, wherein the intensity-color modulator further comprises:
a pair of partially-reflecting surfaces spaced apart by a distance responsive to an amount of charge stored on the pair of partially-reflecting surfaces.

23. The apparatus of claim 20, wherein the intensity-color modulator further comprises:
a control module to vary an optical property of an optical cavity defined by a partially-reflecting surface and a highly reflective surface separated by a distance so as to reflect a wavelength band at an intensity associated with a pixel included in the intensity-color modulator.

24. The apparatus of claim 20, wherein the intensity modulator comprises a pixilated liquid crystal layer.

25. The apparatus of claim 20, wherein the intensity modulator comprises a pixelated, transmissive liquid crystal layer.

26. A system, including:
an intensity modulator;
an intensity-color modulator that includes at least one Fabry-Perot filter having a tunable optical property optically coupled to the intensity modulator; and
a screen to receive light provided by a source and reflected from the intensity-color modulator.

27. The system of claim 26, further including:
means to polarize the light prior to reception by the screen.

28. The system of claim 26, further including:
means to project the light to the screen.

29. The system of claim 26, further including:
an image signal source to couple to the intensity-color modulator.

30. The system of claim 26, further including:
an illumination lens optically coupled to the intensity modulator.

31. An apparatus, including:
a pixelated liquid crystal layer;
a pixelated, variable absorption backplane that includes at least one Fabry-Perot filter having a tunable optical property; and
a relay lens to couple light from the liquid crystal layer to the pixelated, variable absorption backplane.

32. The apparatus of claim 31, wherein the liquid crystal layer comprises a liquid crystal on silicon microdisplay.

33. The apparatus of claim 31, further including:
a polarizer to couple the light to the pixilated liquid crystal layer and the relay lens.

34. The apparatus of claim 31, further including:
a first polarizer disposed between an illumination source and the pixelated liquid crystal layer; and
a second polarizer disposed between the relay lens and the pixelated, variable absorption backplane.

35. The apparatus of claim 31, further including:
a polarizing beamsplitter disposed between the relay lens and the pixelated, variable absorption backplane.

36. A system, including:
a pixelated liquid crystal layer;
a pixelated, variable absorption backplane that includes at least one Fabry-Perot filter having a tunable optical property;
a relay lens to couple light from the liquid crystal layer to the pixelated, variable absorption backplane; and
a screen to receive light provided by a source and reflected from the pixelated, variable absorption backplane.

37. The system of claim 36, further including:
a polarizing beamsplitter to transmit the light to the pixelated, variable absorption backplane.

38. The system of claim 37, further including:
a projection lens to receive the light from the polarizing beamsplitter.

39. The system of claim 36, further including:
an image signal source to couple to the pixelated, variable absorption backplane.

40. The system of claim 36, wherein the screen comprises a rear projection television screen.

* * * * *